(12) United States Patent
Ma (10) Patent No.: US 11,354,214 B2
(45) Date of Patent: Jun. 7, 2022

(54) JUDGMENT METHOD FOR HARDWARE COMPATIBILITY

(71) Applicant: AVerMedia Technologies, Inc., New Taipei (TW)

(72) Inventor: Hsiang-Yi Ma, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 404 days.

(21) Appl. No.: 16/452,739

(22) Filed: Jun. 26, 2019

(65) Prior Publication Data

US 2020/0004656 A1 Jan. 2, 2020

(30) Foreign Application Priority Data

Jun. 29, 2018 (TW) ................................. 107122502

(51) Int. Cl.
| | | |
|---|---|---|
| *G06F 11/34* | (2006.01) | |
| *G06F 16/2455* | (2019.01) | |
| *G06F 11/30* | (2006.01) | |

(52) U.S. Cl.
CPC ........ *G06F 11/349* (2013.01); *G06F 11/3041* (2013.01); *G06F 16/24558* (2019.01)

(58) Field of Classification Search
CPC ............. G06F 11/349; G06F 16/24558; G06F 11/3041; G06F 13/00; G06F 11/221
See application file for complete search history.

(56) References Cited

U.S. PATENT DOCUMENTS

| | | | | |
|---|---|---|---|---|
| 8,484,387 | B2 * | 7/2013 | Kim ................... | G06F 13/4072 710/16 |
| 8,601,173 | B2 * | 12/2013 | Sung ..................... | G09G 5/006 710/62 |
| 8,881,300 | B2 * | 11/2014 | Pistoia ................... | G06F 21/50 726/26 |
| 9,356,729 | B2 * | 5/2016 | Liu ....................... | H04L 1/0033 |
| 9,569,112 | B1 * | 2/2017 | Chuah .................... | G06F 3/067 |
| 9,672,127 | B2 * | 6/2017 | Fluet .................... | G06F 11/221 |

(Continued)

*Primary Examiner* — Matthew J Brophy (74) *Attorney, Agent, or Firm* — McClure, Qualey & Rodack, LLP (57) ABSTRACT

A judgment method for hardware compatibility is disclosed. The judgment method is operated with a first electrical device and a second electrical device having a plurality of transmission interfaces. The judgment method is started after the first electrical device electrically connected to one of the transmission interfaces of the second electrical device. The judgment method includes an interface information capturing process, a compatibility comparison process, a compatibility determination process and a recommendation execution process. In the interface information capturing process, the interface information of the transmission interface of the second electrical device connected to the first electrical device is captured. In the compatibility comparison process, the interface information is compared with a compatibility database to obtain a comparison result. In the compatibility determination process, the comparison result is compared with the interface information of another transmission interface of the second electrical device to obtain a determination result. In the recommendation execution process, a recommendation information is provided according to the determination result.

10 Claims, 6 Drawing Sheets

(56) References Cited

U.S. PATENT DOCUMENTS

| | | | | |
|---|---|---|---|---|
| 9,946,484 B2* | 4/2018 | Regester | ............... | G06F 3/0613 |
| 2009/0006709 A1* | 1/2009 | Zhao | ..................... | G06F 13/409 |
| | | | | 710/315 |
| 2012/0003863 A1* | 1/2012 | Sung | ...................... | G09G 5/006 |
| | | | | 439/489 |
| 2012/0005377 A1* | 1/2012 | Kim | .................... | G06F 13/4072 |
| | | | | 710/16 |
| 2013/0198737 A1* | 8/2013 | Ricci | ........................ | G06F 8/61 |
| | | | | 717/174 |
| 2013/0318289 A1* | 11/2013 | Tomlin | ................ | H04L 43/0888 |
| | | | | 711/112 |
| 2013/0339557 A1* | 12/2013 | Hsieh | ................. | G06F 13/4027 |
| | | | | 710/63 |
| 2014/0307827 A1* | 10/2014 | Liu | ...................... | H04L 1/0033 |
| | | | | 375/295 |
| 2015/0301974 A1* | 10/2015 | Lin | .................... | G06F 13/4068 |
| | | | | 710/300 |
| 2017/0031610 A1* | 2/2017 | Regester | ............ | G06F 11/3433 |
| 2017/0344455 A1* | 11/2017 | Bangalore | ........... | G06F 11/3495 |

\* cited by examiner

JUDGMENT METHOD FOR HARDWARE COMPATIBILITY

CROSS REFERENCE TO RELATED APPLICATIONS

This Non-provisional application claims priority under 35 U.S.C. § 119(a) on Patent Application No. 107122502 filed in Republic of China on Jun. 29, 2018, the entire contents of which are hereby incorporated by reference.

BACKGROUND

1. Technical Field

The present invention generally relates to a judgment method, and more particularly, to a judgment method for hardware compatibility between the electronic devices.

2. Description of Related Art

Image capture device, or known as image capture card, is an electronic device that captures a continuous digital still frame from an analog video signal or a digital video stream. Such device is commonly found in computer visual systems, where the frame is captured in digital form and the resulting digital signals are displayed, stored or transmitted to other devices directly or through compression. Today's image capture devices generally store multiple frames and can compress images in real time by using compression algorithms such as M.264. The technical requirements of many applications (such as radar microwave acquisition, engineering manufacturing and remote navigation) have led to the development of image capture devices towards "high frame rate" and "high resolution".

In general, an image capture device is connected to a calculator device (computer or mobile device) through a transmission interface. The transmission interface may include universal serial bus (USB), peripheral component interconnect express (PCIe), or other calculator expansion card or connector. Among them, PCIe is the expansion function bus of south bridge chip; it has nothing to do with the operating system, so it also guarantees the compatibility with the original PCI. That is to say, the PCIe interface will coexist with the PCI interface on the motherboard for a long time. It also brings convenience to the user's upgrade. Therefore, the main significance of PCIe is its versatility, which can be used not only for the connection between the south bridge chip and other devices, but also for the connection between chipsets, and even for online graphics processors. This will further simplify the computer system and increase the portability and modularity of the computer.

With the increasing popularity of transmission technology, many operators have invested in the manufacture of these transmission interfaces, which has led to the emergence of products at different quality levels. Even computers or calculators produced by big manufacturers will use some of the poor quality transmission interfaces. But users do not know the detailed specifications of these transmission interfaces and their peripheral components. So after purchasing the image capture device and connecting it to the computer, unexplained errors often occur or the performance of the image capture card cannot be fully played, which is quite inconvenient for users.

Therefore, how to provide a judgment method of hardware compatibility to improve the above-mentioned deficiencies is one of the major objects at present.

SUMMARY OF THE INVENTION

It is therefore an object of the invention to provide a hardware compatibility judgment method that enables users to learn the cause of hardware incompatibility, and to provide suggestions for solutions.

To achieve the above, a judgment method for hardware compatibility is disclosed. The judgment method is operated with a first electronic device and a second electronic device having a plurality of transmission interfaces. The judgment method is started after the first electronic device electrically connected to one of the transmission interfaces of the second electronic device. The judgment method includes an interface information capturing process, a compatibility comparison process, a compatibility determination process and a recommendation execution process. In the interface information capturing process, the interface information of the transmission interface of the second electronic device connected to the first electronic device is captured. In the compatibility comparison process, the interface information is compared with a compatibility database to obtain a comparison result. In the compatibility determination process, the comparison result is compared with the interface information of another transmission interface of the second electronic device to obtain a determination result. In the recommendation execution process, the recommendation information is provided according to the determination result.

In one embodiment of the invention, the judgment method of hardware compatibility further includes a test determination process, comprising the steps of: testing a transmission rate or a communication bandwidth of a transmission interface of the second electronic device and the first electronic device; and then compare the transmission rate with a default rate, or compare the communication bandwidth with a default bandwidth; and when the transmission rate is less than the default rate, or the communication bandwidth is less than the default bandwidth, the interface information capturing process is performed.

In one embodiment of the invention, after the completion of the above test, when the transmission rate is greater than or equal to the default rate, the interface information of the transmission interface is stored in a compatibility data table of the compatibility database. In addition, when the transmission rate is greater than or equal to the default rate, the compatibility check database may not be changed, but put an end to the determination process.

In one embodiment of the invention, the interface information capturing process further includes judging the type of the first transmission interface.

In one embodiment of the invention, the compatibility comparison process compares the interface information with one of an incompatible data table of the compatibility database to generate a comparison result.

In one embodiment of the invention, when the interface information does not exist in the incompatible data table, it further includes adding the interface information to the incompatible data table.

In one embodiment of the invention, the compatibility determining process further includes the steps of: capturing interface information of one of the transmission interfaces other than the transmission interface connected to the first electronic device; and comparing the interface information with the content of the compatibility database to get the determination result.

In one embodiment of the invention, the interface information is compared with a compatible data table or an incompatible data table of the compatibility database.

In one embodiment of the invention, the recommendation execution process further includes causing the first electronic device and the second electronic device to perform data transmission according to the current transmission rate.

In one embodiment of the invention, the interface information includes at least a piece of motherboard information, a piece of operating system version information, a piece of host controller information, a piece of transmission rate information, a piece of bandwidth information, a piece of basic output input system version information, and/or a piece of interface model information.

In summary, the method for judging the hardware compatibility of the present invention is to use the obtained interface information to compare with the compatibility database, and provide recommendation options to the user according to the comparison result, enabling users to learn the current state of hardware incompatibility and get recommendations on how to make exclusions. Therefore, the user can remove the obstacles more accurately without repeated attempts.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
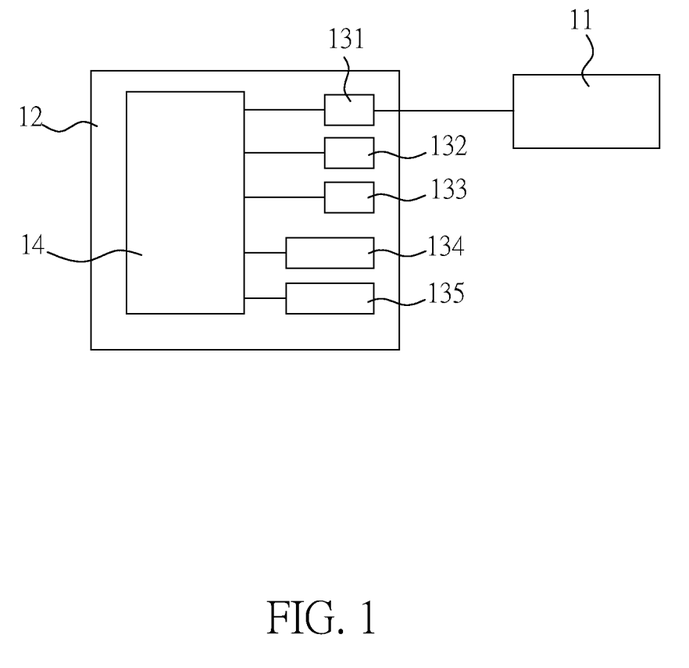
FIG. 1 is a hardware block diagram cooperated with a method for judging hardware compatibility according to a preferred embodiment of the present invention.
Figure 2:
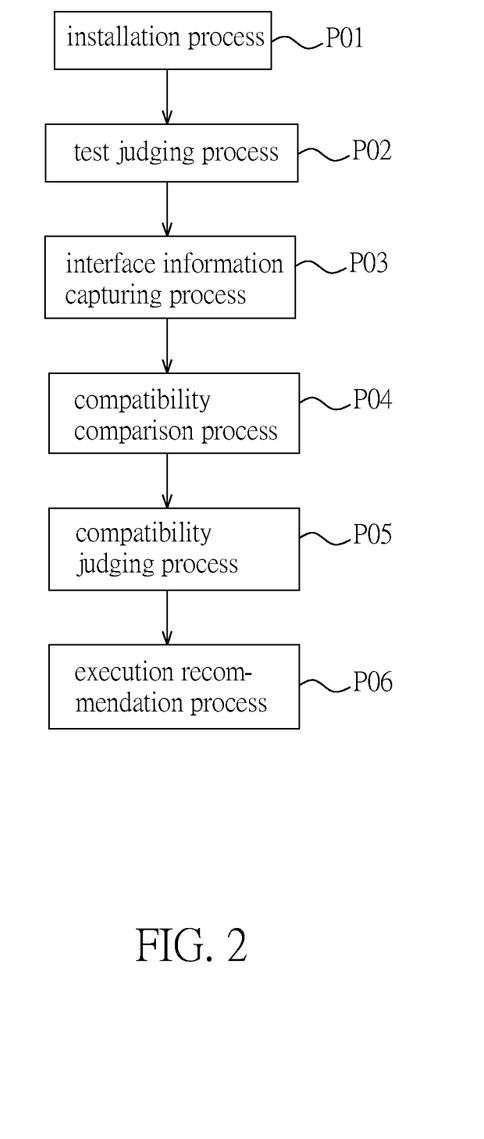
FIG. 2 is a process flow chart showing a method for judging hardware compatibility according to the preferred embodiment of the present invention.

FIG. 1 is a hardware block diagram cooperated with a method for judging hardware compatibility according to a preferred embodiment of the present invention. FIG. 2 is a process flow chart showing a method for judging hardware compatibility according to the preferred embodiment of the present invention. FIGS. 3A to 3D are step flow chart showing a method for judging hardware compatibility according to the preferred embodiment of the present invention.

Refer to FIG. 1, a method for judging hardware compatibility according to a preferred embodiment of the present invention, which is applied by a first electronic device 11 and a second electronic device 12. The first electronic device 11 is, for example, a video streaming device or an image capturing device. The second electronic device 12 is, for example, a desktop computer, a notebook computer, or a mobile computing device. The second electronic device 12 has a plurality of transmission interfaces 131-135 and a mainboard 14. In this embodiment, the transmission interfaces 131-133 are USB transmission interfaces, and the transmission interfaces 134-135 are PCIe transmission interfaces. However, it is not a limitation. In other embodiments, the transmission interface may also include transmission interfaces such as Mini PCIe or M.2.

In the embodiment, the first electronic device 11 is an electronic device of a USB transmission interface, and is electrically connected to the transmission interface 131 of the second electronic device 12 through a USB connection terminal.

Hereinafter, please refer to FIG. 1 and FIG. 2 to illustrate the method for judging hardware compatibility. As shown in FIG. 2, the hardware compatibility judgment method includes processes P01 to P06, which are an installation process P01, a test judging process P02, an interface information capturing process P03, a compatibility comparison process P04, and a compatibility judging process P05 and an execution recommendation process P06.

First, the installation process P01 includes the installation of hardware and software. In short, the first electronic device 11 is electrically connected to the second electronic device 12, and executes the processes of software driving and starting the application.

Next, the test judging process P02 tests the transmission rate between the first electronic device 11 and the second electronic device 12, and compares the obtained transmission rate with a default rate, wherein the default rate represents the first electronic device 11 is in a preferred operational state to know if the current hardware configuration is appropriate. In addition, the test judging process P02 can also test the communication bandwidth between the first electronic device 11 and the second electronic device 12, and compare the obtained communication bandwidth with a default bandwidth, wherein the default bandwidth indicates the first electronic device 11 is in a preferred operational state to know if the current hardware configuration is appropriate. In addition, in this embodiment, the test judging process P02 can be selected and performed by the user in the application after the application is booted.

When the interface information capturing process P03 acquires interface information that the second electronic device 12 is connected to the first electronic device 11 when the transmission rate is less than the default rate. The interface information may include the interface information of the mainboard 14 of the second electronic device 12 and/or the interface information of the transmission interface 131. The interface information of the transmission interface 131 may further include host controller information, transmission rate information, or communication bandwidth information. In other words, the interface information may include a transmission interface between the first electronic device 11 and the second electronic device 12 (for example, a USB transmission interface or a PCIe transmission interface), and a transmission interface of the system of the second electronic device 12 may also be included (such as the transmission interface between the mainboard, display adapter and USB or PCIe).

It should be noted that the above communication bandwidth does not include only the communication bandwidth of the transmission interface to which the first electronic device 11 and the second electronic device 12 are connected. It may further include the system bandwidth in the second electronic device 12, such as the communication bandwidth between the mainboard and the display adapter, or the communication bandwidth that can be used by other transmission interfaces after the system loading the display adapter.

The compatibility comparison process P04 compares the interface information with the content of a compatibility database and obtains a comparison result. The compatibility database may be stored in the first electronic device 11, may be stored in the cloud storage device via the network, or may be stored in a relational database of the application.

The compatibility judging process P05 obtains a determination result based on the comparison result and the interface information of the transmission interfaces 132-135 of the second electronic device 12. According to different transmission interface types (USB, PCIe, mini PCIe, M.2 or other transmission interfaces), different interface information will be used for comparison, and the determination result is to determine whether the first electronic device 11 is compatible with the second electronic device 12.

The execution recommendation process P06 provides advice information to the user based on the determination result. The recommendation information may be displayed on the display unit of the second electronic device 12, the display unit of the first electronic device 11, other display units, or prompt the user by sound, voice, light, etc., and no limitation is made.

Hereinafter, please refer to FIG. 1, FIG. 3A to FIG. 3D to explain the steps of the method for judging hardware compatibility according to the preferred embodiment of the present invention.

Figure 3A:
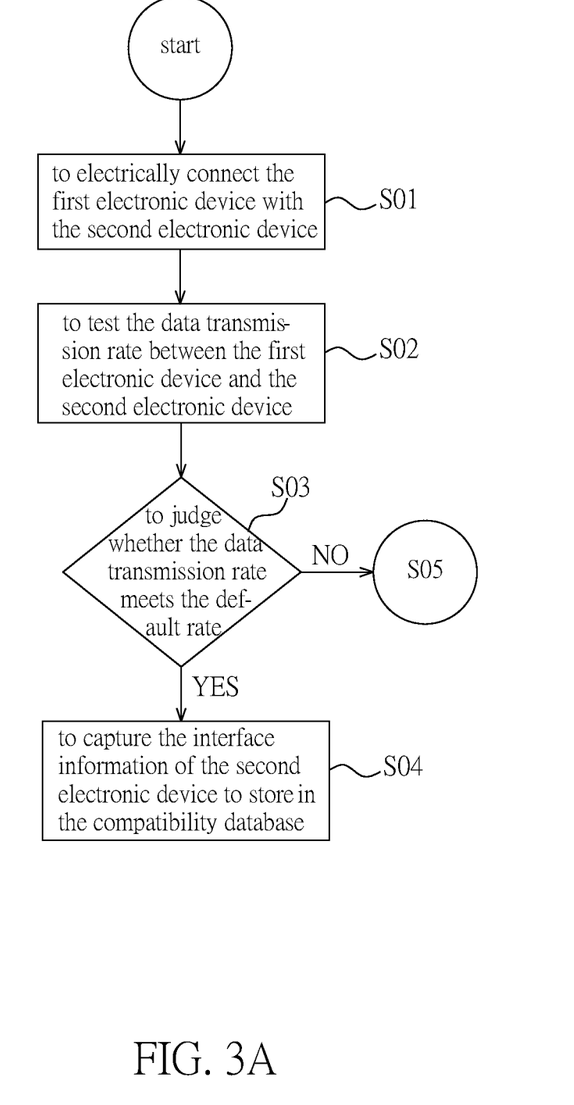
FIGS. 3A to 3D are step flow chart showing a method for judging hardware compatibility according to the preferred embodiment of the present invention.

Step S01 is to electrically connect the first electronic device 11 with the second electronic device 12. In the present embodiment, the first electronic device 11 is electrically connected to the transmission interface 131 of the second electronic device 12 via the USB connection terminal.

Step S02 is to test the data transmission rate or communication bandwidth between the first electronic device 11 and the second electronic device 12. In the present embodiment, the output data of the first electronic device 11 is transmitted to the second electronic device 12 via the transmission interface 131. In other embodiments, the communication bandwidth of each transmission interface announced by the second electronic device 12 can also be tested.

Step S03 is to judge whether the data transmission rate meets the default rate. When the data transmission rate is greater than or equal to the default rate, step S04 is performed. When the data transmission rate is less than the default rate, step S05 is performed. Wherein, when the data transmission rate is lower than the default rate, it means that the hardware configuration is in an incompatible state.

In addition, in other embodiments, step S03 determines whether the communication bandwidth conforms to the default bandwidth. When the communication bandwidth declared by the second electronic device 12 is greater than or equal to the default bandwidth, step S04 is performed. When the communication bandwidth is less than the default bandwidth, step S05 is performed. Wherein, when the communication bandwidth is less than the default bandwidth, it means that the hardware configuration is in an incompatible state.

Step S04 is to capture the interface information of the second electronic device 12, and to store the interface information in a compatible data table of the compatibility database. The interface information includes at least mainboard information, operating system version information, rate information of the transmission interface, bandwidth information, basic output/input system (BIOS) information, information of one interface model, and/or host controller information.

Step S05 is to determine whether the first electronic device 11 is a USB electronic device. If the result is "YES", step S06 is performed, and if the result is "NO", step S14 is performed. So the type of the first electronic device 11 can be determined by determining the transmission interface to which the second electronic device 12 is connected.

Figure 3B:
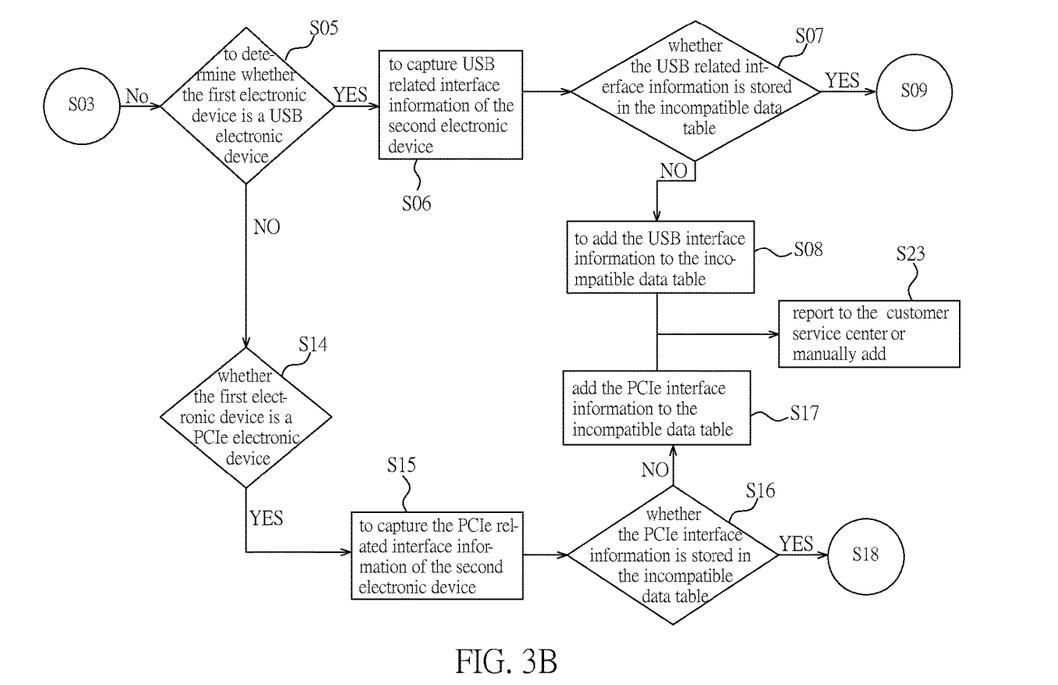

Step S06 is to capture USB related interface information of the second electronic device 12. In the present embodiment, the USB related interface information includes at least host controller information and mainboard information.

Step S07 is to determine whether the USB related interface information is stored in the incompatible data table of the compatibility database. If the result is "NO", step S08 is performed, and if the result is "YES", then step S09 is performed.

Step S08 is to add the USB interface information to the incompatible data table of the compatibility database. Among them, the compatibility database with the newly added USB interface information can be uploaded to the cloud device for storage, and accordingly, the content of the compatibility database can be gradually completed.

Step S09 is to determine whether other USB host controller information conforming to the second electronic device is stored in the compatible data table of the compatibility database. If the result is "YES", step S10 is performed, and if the result is "NO", step S11 is performed.

Step S10 is to recommend that the user select a compatible USB transmission interface in the second electronic device 12. In the present embodiment, the compatible USB transmission interface can be displayed in a text mode or an image mode so that the user can clearly know the location or number of the compatible USB transmission interface.

Step S11 is to determine whether the second electronic device 12 has other unknown USB host controller information. Here, the term "unknown" means that the second electronic device 12 has USB host controller information that is not recorded in the compatibility database. If the result is "YES", step S12 is performed, and if the result is "NO", step S13 is performed.

Step S12 is to recommend that the users try other USB transmission interfaces.

Step S13 is to recommend that the user use a compatible USB expansion card.

Figure 3C:
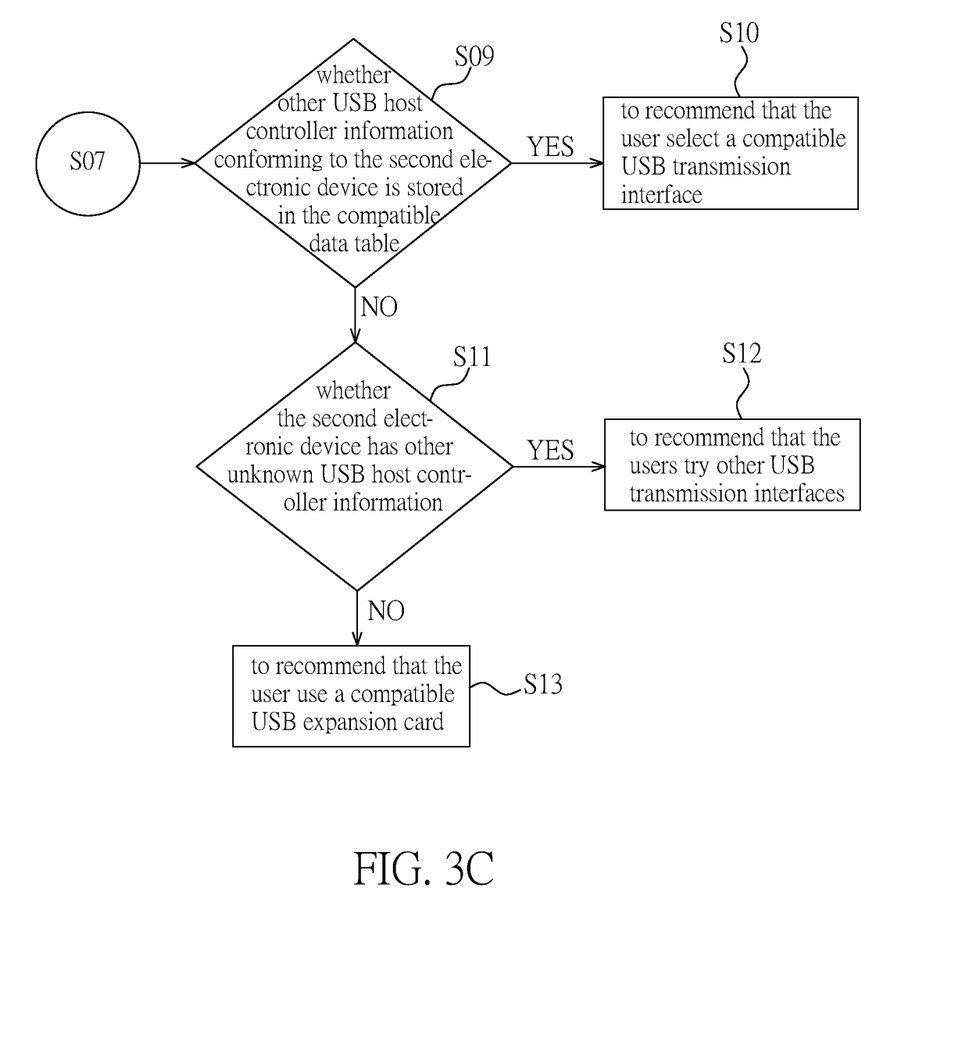

Step S14 is to determine whether the first electronic device 11 is a PCIe electronic device. If the result is "YES", step S15 is performed.

Step S15 is to capture the PCIe related interface information of the second electronic device 12. In the present embodiment, the PCIe related interface information includes at least a PCIe slot transmission rate, a PCIe slot version, mainboard information, and BIOS version information.

Step S16 is to determine whether the PCIe interface information is stored in the incompatible data table of the compatibility database. If the result is "NO", step S17 is performed, and if the result is "YES", then step S18 is performed.

Step S17 is to add the PCIe interface information to the incompatible data table of the compatibility database. The compatibility database with the newly added PCIe interface information can be uploaded to the cloud device for storage, and accordingly, the content of the compatibility database can be gradually completed.

Figure 3D:
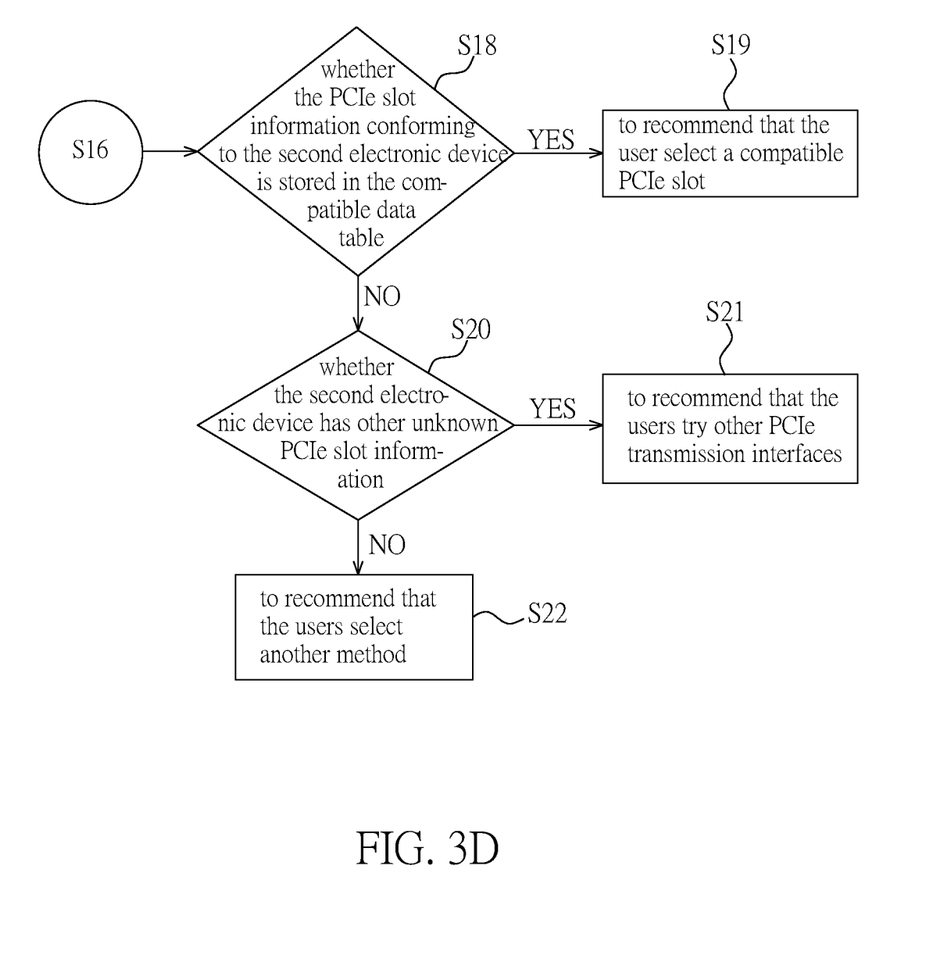

Step S18 is to determine whether the PCIe slot information conforming to the second electronic device is stored in the compatible data table of the compatibility database. If the result is "YES", step S19 is performed, and if the result is "NO", step S20 is performed.

Step S19 is to recommend that the user select a compatible PCIe slot in the second electronic device 12. In the present embodiment, the compatible PCIe slot can be displayed in a text mode or image mode so that the user can clearly know the location or number of the compatible PCIe slot.

Step S20 is to determine whether the second electronic device 12 has other unknown PCIe slot information. Here, the term "unknown" indicates that the second electronic device 12 has PCIe slot information that is not recorded in the compatibility database. If the result is "YES", step S21 is performed, and if the result is "NO", step S22 is performed.

Step S21 is to recommend that the users try other PCIe transmission interfaces.

Step S22 is to recommend that the users select another method, for example: 1. Perform data transmission at a lower bandwidth or transmission rate (current bandwidth or current transmission rate); 2. Confirm the mainboard manual; or 3. Try to connect the first electronic device 11 to the other second electronic device.

In the present embodiment, after the execution of the abovementioned steps S10, S12, S13, S19, S21, and S22 are performed, step S02 may be performed again. In addition, after performing the above steps S08, S17, step S23 may be optionally performed.

Step S23 to report the results of steps S08 and S17 to the product customer service center to complete the content of the compatibility database, or manually add and adjust the content of the compatibility database to improve the correctness of the compatibility database.

In addition, it should be noted that the above steps S05 and S14 can be combined into a judging step, which is to judge whether the first electronic device 11 is a USB electronic device or a PCIe electronic device. If the result of the determination is a USB electronic device, step S06 is performed; if the result of the determination is a PCIe electronic device, step S15 is performed.

Furthermore, the user may pre-download and install the foregoing application in the second electronic device 12 before purchasing the first electronic device 11 to execute the interface information capturing process P03 and the compatibility comparison process P04, compatibility judgment process P05, and execution recommendation process P06 as shown in FIG. 2. Thereby, the user can first evaluate whether the second electronic device 12 is compatible with the first electronic device 11 before purchasing the first electronic device 11.

In summary, the method for judging the hardware compatibility of the present invention is to use the obtained interface information to compare with the compatibility database, and provide recommendation options to the user according to the comparison result, enabling users to learn the current state of hardware incompatibility and get recommendations on how to make exclusions. Therefore, the user can remove the obstacles more accurately without repeated attempts. In addition, the user may also first start the application in the second electronic device owned by him to execute the judgment method of part of the hardware compatibility, thereby initially judging whether the second electronic device is compatible with the first electronic device to be used.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A judgment method for hardware compatibility is operated with a first electronic device and a second electronic device having a plurality of transmission interfaces, the judgment method is started after one of the transmission interfaces of the second electronic device electrically connected to the first electronic device, comprising: an interface information capturing process, which is capturing an interface information of the transmission interface electrically connected to the first electronic device; a compatibility comparison process, which is to compare the interface information of the transmission interface electrically connected to the first electronic device with the interface information stored in an incompatible data table of a compatibility database; a compatibility determination process, which is to capture the interface information of each of the other transmission interfaces that are not electrically connected to the first electronic device and to compare the interface information of the other transmission interface with the interface information stored in a compatible data table or the incompatible data table of the compatibility database; and an execution recommendation process, which is providing a recommendation information according to a comparison result of the compatibility comparison process and a determination result of the compatibility determination process;
wherein the compatible data table being to store the interface information that is compatible with the transmission interface of the first electronic device and the incompatible data table being to store the interface information that is incompatible with the transmission interface of the first electronic device.

2. The judgment method of claim 1, further comprises a test determination process, comprising: testing a transmission rate or a communication bandwidth of a transmission interface electrically connected to the first electronic device; comparing the transmission rate with a default rate, or comparing the communication bandwidth with a default bandwidth; and determining that the transmission interface being incompatible with the first electronic device and performing the interface information capturing process to capture the interface information of the transmission interface when the transmission rate is less than the default rate, or the communication bandwidth is less than the default bandwidth.

3. The judgment method of claim 2, wherein after the completion of the test determination process, when the transmission rate is greater than or equal to the default rate, or when the communication bandwidth is greater than or equal to the default bandwidth, the transmission interface being determined compatible with the first electronic device and then the interface information of the transmission interface is added to the compatibility data table of the compatibility database, or put an end to the test determination process.

4. The judgment method of claim 1, wherein the interface information capturing process further comprises judging the type of the first transmission interface electronic device.

5. The judgment method of claim 1, further comprises adding the interface information to the incompatible data table when the interface information does not exist in the incompatible data table.

6. The judgment method of claim 1, wherein the execution recommendation execution process further comprises causing the first electronic device and the second electronic device to perform data transmission according to the current transmission rate.

7. The judgment method of claim 1, wherein the interface information comprises at least a piece of mainboard information, a piece of operating system version information, a piece of host controller information, a piece of transmission rate information, a piece of bandwidth information, a piece of basic output input system version information, and/or a piece of interface model information.

8. The judgment method of claim 1, wherein the recommendation information of the execution recommendation process is to recommend that the user select the transmission interface that is electrically connected to the first electronic device or select other transmission interfaces of the second electronic device corresponding to the compatible data table.

9. The judgment method of claim 1, further comprising: a test determination process, which is to measure a transmission rate or a communication bandwidth of a transmission interface electrically connected to the first electronic device and to compare the measured transmission rate with a default rate or to compare the measured communication bandwidth with a default bandwidth to determine whether the transmission interface being compatible with the first electronic device.

10. The judgment method of claim 1, further comprising:
a test determination process, comprising:
testing a transmission rate or a communication bandwidth of a transmission interface electrically connected to the first electronic device;
comparing the transmission rate with a default rate, or comparing the communication bandwidth with a default bandwidth; and
determining that the transmission interface being compatible with the first electronic device and adding the interface information of the transmission interface to a compatibility data table of the compatibility database, or put an end to the test determination process when the transmission rate is greater than the default rate, or the communication bandwidth is greater than the default bandwidth;
wherein the compatibility data table is to store the interface information of the transmission interface compatible with the first electronic device.

* * * * *